United States Patent

Hirahata et al.

Patent Number: 5,132,793
Date of Patent: Jul. 21, 1992

[54] TELEVISION RECEIVER COMPATIBLE WITH BOTH STANDARD SYSTEM TELEVISION SIGNAL AND HIGH DEFINITION TELEVISION SIGNAL

[75] Inventors: Shigeru Hirahata; Shinobu Torikoshi, both of Yokohama; Toshiyuki Sakamoto, Fujisawa; Takumi Okamura, Yokohama; Noboru Kojima, Kawasaki; Tetsuo Mitsuhashi, Zama; Isao Kondo, Tokyo; Yuichi Ninomiya, Kawasaki; Koichi Yamaguchi, Yokohama; Toshiro Ohmura, Mitaka, all of Japan

[73] Assignees: Hitachi, Ltd.; Nippon Hoso Kyokai, both of Tokyo, Japan

[21] Appl. No.: 490,850

[22] Filed: Mar. 9, 1990

[30] Foreign Application Priority Data

Mar. 10, 1989 [JP] Japan .................................. 1-056461

[51] Int. Cl.$^5$ ........................ H04N 7/01; H04N 5/46
[52] U.S. Cl. ..................................... 358/140; 358/11; 358/141; 358/12
[58] Field of Search ................... 358/140, 141, 11, 12, 358/158, 188, 181

[56] References Cited

U.S. PATENT DOCUMENTS

| | | | |
|---|---|---|---|
| 4,414,571 | 11/1983 | Kureha et al. | 358/158 |
| 4,651,208 | 3/1987 | Rhodes et al. | 358/140 |
| 4,743,958 | 5/1988 | Bannister et al. | 358/140 |
| 4,860,090 | 8/1989 | Murata et al. | 358/11 |
| 4,908,697 | 3/1990 | Tsingberg et al. | 358/141 |
| 4,931,855 | 6/1990 | Salvadorini | 358/141 |

FOREIGN PATENT DOCUMENTS

| | | |
|---|---|---|
| 0169527 | 1/1986 | European Pat. Off. |
| 0200788 | 8/1989 | Japan |
| 0221068 | 9/1989 | Japan |
| 0236782 | 9/1989 | Japan |
| 0113781 | 4/1990 | Japan |
| 8912940 | 12/1989 | World Int. Prop. O. |

Primary Examiner—James J. Groody
Assistant Examiner—Michael H. Lee
Attorney, Agent, or Firm—Antonelli, Terry, Stout & Kraus

[57] ABSTRACT

There is disclosed a compatible television receiver capable of receiving and reproducing both the standard system television signal and the high definition television signal and capable of confining the degradation of picture quality of the high definition television signal to the minimum, in which the received standard system television signal and high definition television signal are respectively converted to non-interlace signals, and scanning is selectively performed with either of non-interlace video signals to display images. The television receiver according to the present invention comprises a first conversion circuit for receiving an interlace standard system television signal and converting it into a non-interlace television signal, a second conversion circuit for receiving an interlace high definition television signal and converting it into a non-interlace television signal, a circuit for discriminating whether the received signal is the standard system television signal or the high definition signal, and a circuit for selecting either of outputs of the first and second conversion circuits on the basis of the result obtained in the discrimination circuit.

11 Claims, 7 Drawing Sheets

TELEVISION RECEIVER COMPATIBLE WITH BOTH STANDARD SYSTEM TELEVISION SIGNAL AND HIGH DEFINITION TELEVISION SIGNAL

BACKGROUND OF THE INVENTION

The present invention relates to a television receiver compatible with standard/high definition television signals capable of receiving and reproducing television signals of two different systems, i.e., the standard television signal and the high definition television signal.

In response to the demand for higher picture quality of television receivers, a high definition television system is being newly developed in recent years. The high definition television system was proposed by Nippon Hoso Kyokai (NHK) in advance of others in the world. In the high definition television system thus proposed, the aspect ratio of the screen is 16:9 (or 5:3) and the number of scanning lines is 1125, resulting in a system different from the current standard television system (i.e., the NTSC system having the aspect ratio of 4:3 and the number of scanning lines equivalent to 525).

As a broadcast service form of this high definition television, the high-vision satellite transmission system (hereafter referred to as MUSE) for transmitting bandwidth-compressed signals by using a broadcasting satellite has been developed. The principle, signal format and schematic configuration of the receiving apparatus of this MUSE are described in "An HDTV Broadcasting System Utilizing a Bandwidth Compression Technique-MUSE", Yuichi Ninomiya et al., IEEE Trans., Vol. BC-33, No. 4, pp. 130–160, December 1987. Upon the start of such high definition television broadcasting, the receiving apparatus is requested to be capable of receiving signals of the two systems, i.e., the conventional standard television signal and the MUSE signal. In response to such a request, several processing methods have heretofore been devised. For example, Japanese Patent Applications JP-A-59-70369 and JP-A-59-104866, each of which discloses a conversion system between the high definition television system and the standard television system, JP-A-61-206380, JP-A-61-206381, JP-A-63-26172 and JP-A-63-263783, each of which discloses a method for eliminating the difference in aspect ratio, and JP-A-62-206977, which discloses an image memory commonly used for processing of both systems, can be mentioned.

Further, examples of known literature relating to the technical field of the present invention will now be described. U.S. Pat. No. 4,733,300 issued on Mar. 22, 1988 to Sugiyama et al. discloses a circuit for converting an interlace television signal to a noninterlace (or sequential scanning) television signal. U.S. Pat. No. 4,733,297 issued on Mar. 22, 1988 to Katsumata et al. discloses a circuit for applying motion-adaptive processing to video signals. Japanese Patent Application laid-open No. JP-A-58-81386 filed by Miura et al. on Nov. 10, 1981, discloses a system in which the number of scanning lines of the standard NTSC signal is converted to become twice so as to attain compatibility with the high definition television signal. Japanese Patent Application laid-open No. JP-A-61-267469 field by Nagashima on May 21, 1985, discloses a system in which two different television systems are made common in number of scanning lines so as to attain compatibility.

In the above described related techniques, consideration is not given to the fact that the MUSE signal is also received and processed in the so-called double speed television system in which the standard television signal is displayed after its interlace scanning has been converted into sequential scanning. The following problems are thus posed.

(1) In case a 16:9 high definition display is used:

Since the MUSE signal is subject to complete decode processing, the scale of the processing circuit increases, resulting in a higher cost.

(2) In case a 4:3 standard display is used:

Since the MUSE signal is converted to the standard television signal, significant lowering in picture quality is caused.

SUMMARY OF THE INVENTION

An object of the present invention is to provide a compatible television receiver capable of receiving both the standard system television signal and the high definition television signal and capable of confining the degradation of picture quality of the high definition television signal to a minimum, in which the received standard system television signal and high definition television signal are respectively converted to non-interlace signals, and scanning is selectively performed with either of non-interlace video signals to display images.

Another object of the present invention is to provide a television receiver comprising a circuit for judging whether the received signal is the standard system television signal or the high definition television signal.

A television receiver compatible with the standard system television signal/high definition television signal according to the present invention and achieving the above described objects comprises a first conversion circuit for receiving an interlace standard system television signal and converting it into a non-interlace television signal, a second conversion circuit for receiving an interlace high definition television signal and converting it into a non-interlace television signal, a circuit for discriminating whether the received signal is the standard system television signal or the high definition television signal, and a circuit for selecting either of outputs of the first and second conversion circuits on the basis of the result obtained in the discrimination circuit.

The standard television signal sequential scanning conversion circuit (i.e., the first conversion circuit) reduces impairment such as flicker caused by interlace scanning of the standard television signal and produces a video signal having a higher picture quality. The high definition television sequential scanning conversion circuit (i.e., the second conversion circuit) converts, say, 1125 scanning lines into a sequential scanning signal having 562 scanning lines, and has a simpler circuit configuration as compared with conventional complete decode processing of the MUSE signal. In addition, this circuit produces a video signal having a high picture quality and a vertical resolution improved as compared with the conventional circuit for converting the high definition television signal to the standard television signal. The television system detection and control circuit (discrimination circuit) detects the system of the received television signal, controls a selection circuit supplied with outputs of the above described two scanning conversion circuits, and correctly outputs a video signal which agrees with the received television signal and which has undergone sequential scanning conversion processing.

DESCRIPTION OF THE PREFERRED EMBODIMENTS

Figure 1:
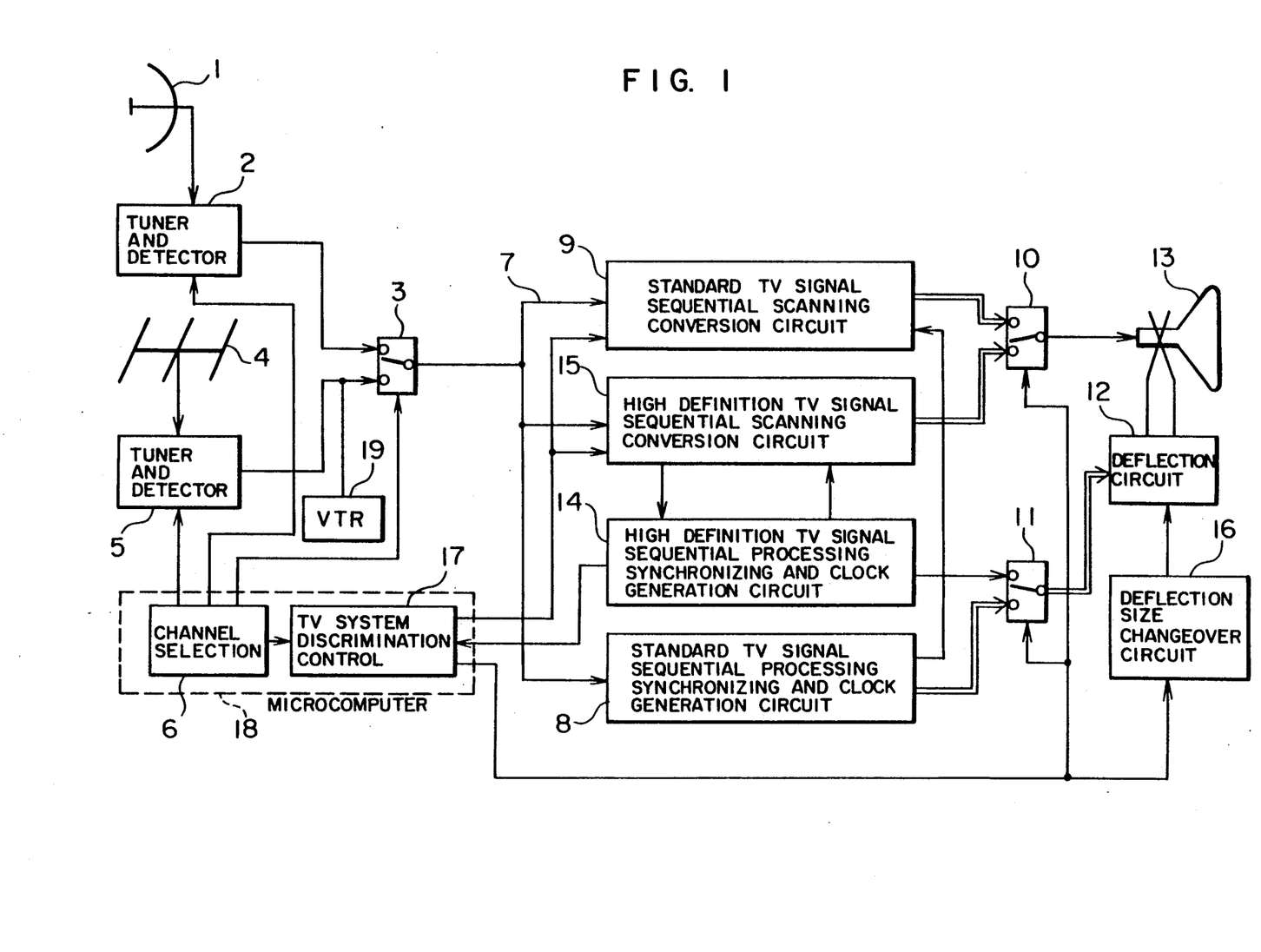
FIG. 1 is a block diagram showing an embodiment of a compatible standard/high definition television receiver according to the present invention.

The present invention will hereafter be described in detail by referring to the drawings. FIG. 1 shows an embodiment of a standard/high definition television receiver according to the present invention. In FIG. 1, a MUSE signal or a standard television signal (hereafter abbreviated to NTSC signal) which has undergone FM modulation is inputted to a satellite broadcast antenna 1, and converted into a baseband signal by a tuner and detector circuit 2. The resultant baseband signal is supplied to a changeover circuit 3. Further, a standard television signal which has undergone AM modulation is inputted to a UHF/VHF antenna 4 and converted into a baseband signal by a tuner and detector circuit 5. The resultant baseband signal is supplied to the changeover circuit 3. The tuner and detector circuits 2 and 5 as well as the changeover circuit 3 are controlled by a channel tuning circuit 6 so that a broadcast wave or a channel desired by the user may be selected. Therefore, either the MUSE signal or the NTSC signal is outputted from the changeover circuit 3 onto a signal path 7. The video output of a video tape recorder 19 may be connected to the input of the changeover circuit 3.

First of all, the case where the NTSC signal arrives at the antenna will now be described. In this case, an interlace scanning video signal is converted into a sequential scanning video signal by a standard television sequential scanning conversion circuit 9 on the basis of a synchronizing signal and a clock signal generated by a standard television sequential processing synchronizing and clock generation circuit 8. The resultant sequential scanning video signal is supplied to a display circuit 13 via a video changeover circuit 10. In the same way as for a synchronizing signal, a horizontal synchronizing signal having a frequency of 31.5 KHz, which is equivalent to twice the frequency of 15.7 KHz of the horizontal synchronizing signal, is generated by the standard TV sequential processing synchronizing and clock generation circuit 8 and supplied to a deflection circuit 12 via a synchronizing changeover circuit 11. The deflection circuit 12 performs deflection of a display circuit 13 in the horizontal and vertical directions. On the basis of the video signal inputted to the display circuit 13, an image of sequential scanning having 525 scanning lines per field is thus reproduced.

The case where the MUSE signal arrives at the antenna will now be described. In case of the MUSE signal, the analog signal is converted into a digital signal to cause accurate digital synchronization and thereafter a synchronizing signal and a clock signal are reproduced by a high definition television sequential processing synchronizing and clock generation circuit 14. On the basis of the synchronizing signal and clock signal, an interlace scanning video signal having 1125 scanning lines per frame is converted into a sequential scanning video signal having 562/563 scanning lines per field by a high definition television sequential scanning conversion circuit 15. The resultant sequential scanning video signal is supplied to the display circuit 13 via the video changeover circuit 10. As for the synchronizing signal, a vertical synchronizing signal for sequential scanning synchronized to the horizontal synchronizing signal is generated by the high definition television sequential processing synchronizing and clock generation circuit 14. The vertical synchronizing signal thus generated is supplied to the deflection circuit 12 via the synchronizing changeover circuit 11. In the deflection circuit 12, the deflected horizontal size or vertical size is changed by a deflection size changeover circuit 16 so that the difference in aspect ratio between the standard television sequential scanning signal and the high definition television sequential scanning signal may be absorbed. An image is thus reproduced on the display circuit 13 with an aspect ratio conforming to the MUSE signal.

Discrimination of the signalling system of the above described NTSC signal and MUSE signal is performed by a television system discrimination control circuit 17. To be concrete, discrimination is performed by using channel tuning information supplied from the channel tuning circuit 6 and pull-in information supplied from the high definition TV sequential processing synchronizing and clock generation circuit 14. Depending upon the result of discrimination, the television system discrimination control circuit 17 controls the video changeover circuit 10, the synchronizing changeover circuit 11, and the deflection size changeover circuit 16 to effect switching. Further, power dissipation can be lowered by temporarily stopping the circuit operation of an unnecessary portion of either the standard television sequential scanning conversion circuit 9 or the high definition television sequential scanning conversion circuit 15 on the basis of the discrimination output of the television system discrimination control circuit 17. The television system discrimination control circuit 17 can be implemented together with the channel tuning circuit 6 by using one microcomputer 18.

The embodiment shown in FIG. 1 has heretofore been described. In order to make the circuit operation and effects of the apparatus shown in FIG. 1 further clear, operation of its principal circuits will now be described in further detail.

Figure 2:
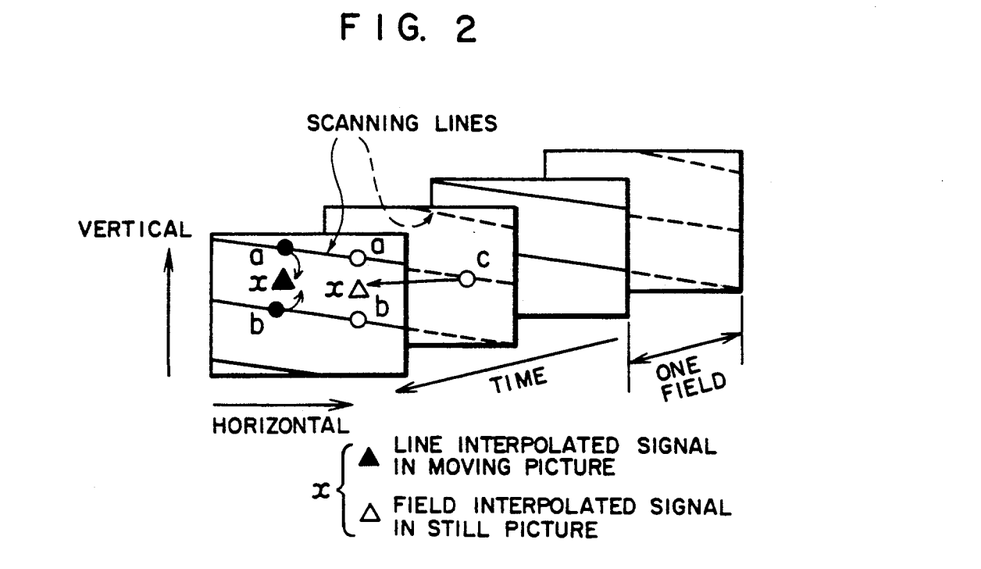
FIG. 2 is a diagram showing the principle of sequential scanning conversion of a standard television signal.
Figure 3:
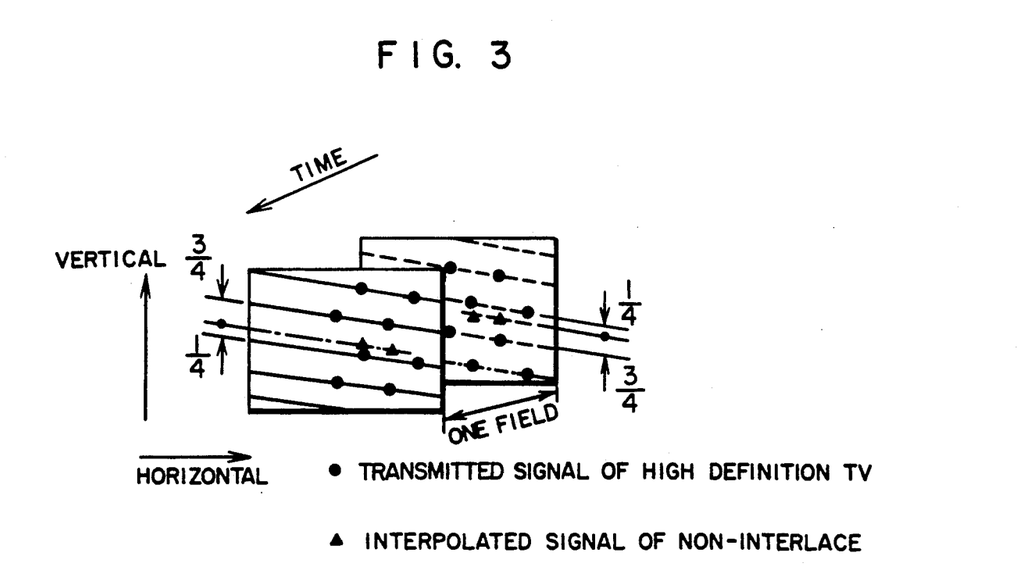
FIG. 3 is a diagram showing the principle of sequential scanning conversion of a high definition television signal.
Figure 4:
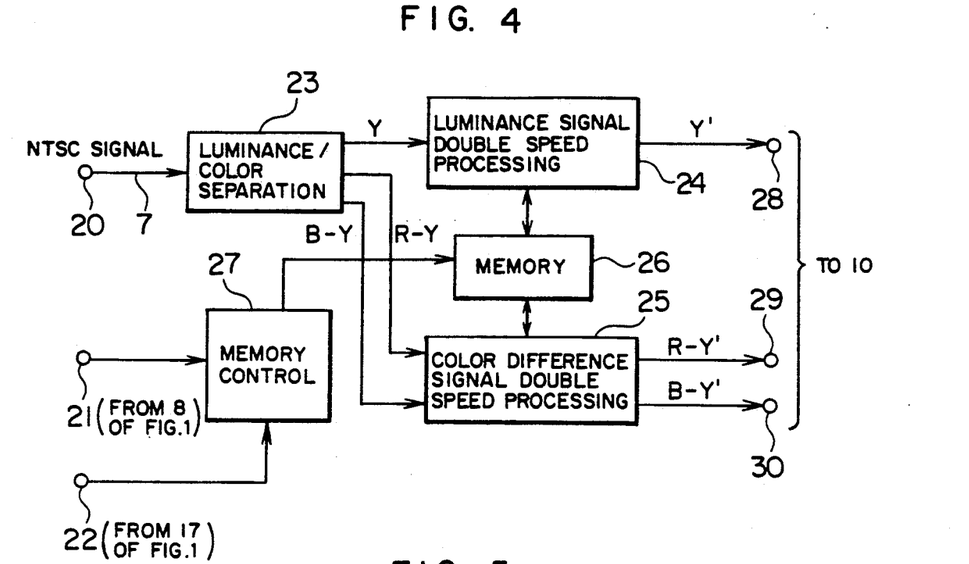
FIG. 4 is a block diagram showing a concrete example of a principal constitute circuit of the television receiver shown in FIG. 1.
Figure 5:
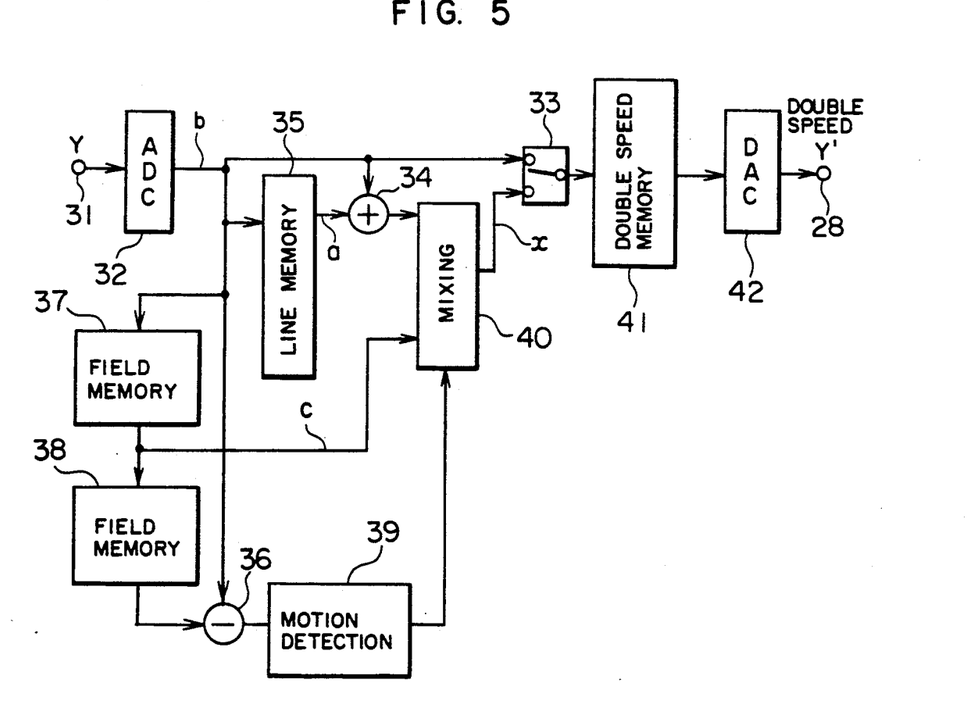
FIG. 5 is a block diagram showing an example of configuration of a luminance signal double speed processing circuit shown in FIG. 4.
Figure 6:
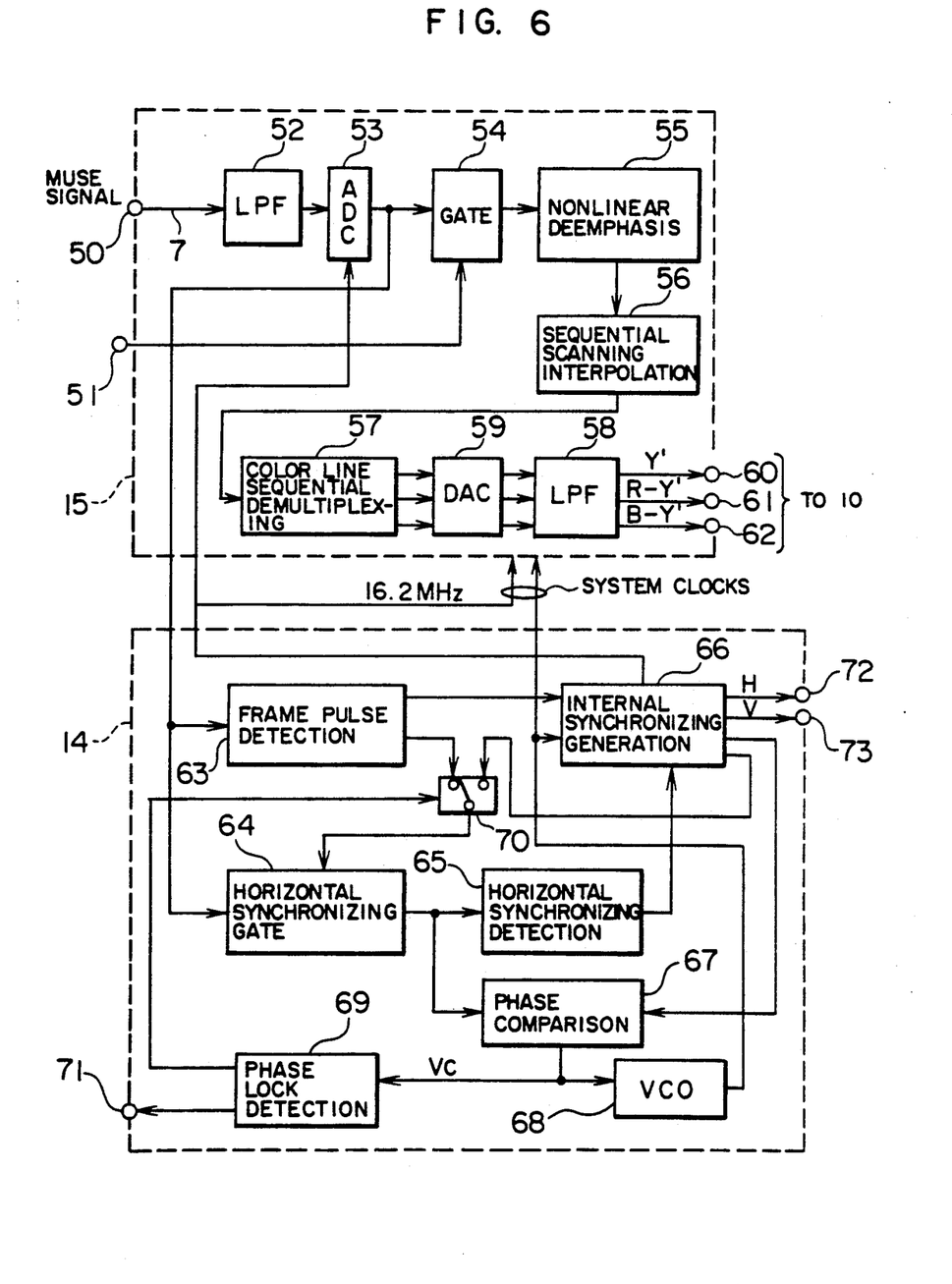
FIG. 6 is a block diagram showing a concrete example of another principal constituent circuit of the television receiver shown in FIG. 1.

FIG. 2 is a diagram showing the principle of sequential scanning conversion of the standard television signal. FIG. 3 is a diagram showing the principle of sequential scanning conversion of the high definition television signal. FIG. 4 is a diagram showing an example of the standard television sequential scanning conversion circuit included in the apparatus of FIG. 1. FIG. 5 is a diagram showing an example of a luminance signal double speed processing circuit included in the circuit of FIG. 4. FIG. 6 is a diagram showing an example of the high definition television signal processing circuit. FIGS. 7 to 11 are diagrams for illustrating the operation of principal circuits included in the circuit of FIG. 6. FIGS. 12A to 12D are diagrams showing examples of the display screen.

First of all, an example of sequential scanning conversion of NTSC signal will now be described by referring to FIGS. 2, 4 and 5. As is generally known, the NTSC signal uses interlace scanning, and 525 vertical scanning lines per frame (1/30 sec) are divided in two fields (1/60 sec). That is to say, 262.5 vertical scanning lines are transmitted in the n-th field (where n is a positive integer), and 262.5 remaining vertical scanning lines are transmitted in the succeeding (n+1)-th field. Sequential scanning conversion comprises the steps of producing new interpolation scanning lines between scanning lines transmitted in a certain field and producing signals for reproducing 525 scanning lines in one field as shown in FIG. 2. FIG. 4 shows an example of the circuit for performing such processing. In FIG. 4, numeral 20 denotes a signal input terminal coupled to the changeover circuit 3. Numeral 21 denotes a signal input terminal coupled to the standard television sequential processing synchronizing and clock generation circuit shown in FIG. 1, and numeral 22 denotes a signal input terminal coupled to the television system discrimination control circuit 17 shown in FIG. 1. The NTSC signal inputted from the terminal 20 is separated into a luminance signal Y and color difference signals R-Y and B-Y by a luminance signal-color signal separation circuit 23. The luminance signal Y and the color difference signals R-Y and B-Y are supplied to a luminance signal double speed processing circuit 24 and a color difference signal double speed processing circuit 25, respectively. By using a video signal recorded in a memory 26 and then reproduced, the luminance signal double speed processing circuit 24 produces a luminance signal Y' corresponding to the double speed scanning and outputs it to an output terminal 28. In the same way, the color difference signal double speed processing circuit 25 also produces color difference signals R-Y' and B-Y' corresponding to double speed scanning and outputs them to output terminals 29 and 30. Signals outputted to the output terminals 28, 29 and 30 are supplied to the video changeover circuit 10. By using the synchronizing signal and the clock signal inputted from the terminal 21, a memory control circuit 27 performs recording and reproduction control for the memory 26. By using a control signal inputted to the memory control circuit 27 through the terminal 22, it is possible to stop the operation of the memory and reduce the power dissipation when the MUSE signal comes in.

FIG. 5 shows an example of the luminance signal double speed processing circuit 24 shown in FIG. 4. In the circuit of FIG. 5, signal processing adapted to the movement of the image is performed. Its operation can be explained so as to correspond to the production principle of the interpolation signal shown in FIG. 2. Numeral 31 denotes an input terminal of the luminance signal Y separated by the luminance signal-color signal separation circuit 23. In order to make its corresponding relationship to FIG. 2 clear, characters a, b, c and x represent respective signal paths and signals. An ADC 32 shown in FIG. 5 converts the luminance signal Y into a digital signal, and supplies the digital signal to a changeover circuit 33, an addition circuit 34, a line memory 35, a subtraction circuit 36 and a field memory 37. In the addition circuit 34, a signal a delayed by the line memory 35 and a signal b on the signal path b undergo averaging, and the result is supplied to a mixing circuit 40. A signal c resulting from delay in the field memory 37 is inputted to another input of the mixing circuit 40. Further, the difference between a signal which has undergone frame delay in another field memory 38 and the signal b is derived by the subtraction circuit 36. In a motion detection circuit 39, the difference thus derived is converted into a motion signal for separating a moving picture region of a video signal from a still picture region thereof. The resultant motion signal is supplied to the mixing circuit 40. When the motion signal supplied from the motion detection circuit 39 indicates the moving picture region, the output signal (a+b)/2 of the addition circuit 34 is selected by the mixing circuit 40 as shown in FIG. 2. When the motion signal indicates the still picture region, the output signal c of the field memory 37 is selected by the mixing circuit 40. The signal thus selected by the mixing circuit 40 is outputted onto a signal path x. The changeover circuit 33 is switched to select the signals b and x respectively as an actual scanning line signal and an interpolation scanning signal. The signal thus selected by the changeover circuit 33 is supplied to a double speed memory 41. A line memory HM 63021 produced by Hitachi can be used as the double speed memory 21. The input signal of the double speed memory 41 is converted into a signal having a halved horizontal scanning period. The result of conversion is supplied to a DAC 42. In the DAC 42, the digital signal is converted into an analog luminance signal Y' doubled in speed, which is outputted on the output terminal 28.

Sequential scanning conversion of a standard television signal has heretofore been described. Its configuration is not limited to that of FIGS. 4 and 5 so long as images can be reproduced in sequential scanning conversion with a higher picture quality than that of the conventional standard television. A television processing system comprising the steps of separating the signal into the luminance signal and the color signal by using a frame memory and performing interpolation processing by using a field memory as the so-called IDTV (improved definition television) also corresponds to such a sequential scanning conversion circuit.

An example of sequential scanning conversion of a MUSE signal will now be described by referring to FIG. 3 and FIG. 6 and succeeding drawings.

A sequential scanning conversion circuit of a high definition television signal according to the present invention has a feature that the MUSE signal is not completely decoded to reproduce the interlace high definition television signal but a sequential scanning television signal of one field is produced by using an interlace television signal of one field. This feature allows simpler for a circuit configuration and a minimized memory capacity. In addition, this feature makes it possible to provide a picture quality which is more excellent than that of the standard television signal while confining the degradation of high picture quality of the high definition television signal to the minimum.

The MUSE signal is a signal reduced in bandwidth by using offset sampling between fields and between frames for the still picture region of the image and by using line offset sampling for the moving picture region of the image. As understood from the transmitted signal roughly indicated by black circles in FIG. 3, interlace scanning is used in the same way as the NTSC signal. Although its detailed form of transmitted signal is described in the aforementioned reference, i.e., IEEE Trans. Vol. BC-33, No. 4, the number of vertical scanning lines per frame is 1125 and the number of effective scanning lines is 1032. Therefore, the number of vertical scanning lines of the MUSE signal is reduced to one half so that the number of scanning lines may become nearly equivalent to the number 525 of vertical scanning lines of the standard television signal which has undergone sequential scanning conversion. Sequential scanning conversion is then performed. As shown in FIG. 3, therefore, the sequential scanning conversion of the MUSE signal comprises the steps of producing a new interpolation scanning line having an equivalent scanning position between fields by using transmitted scanning lines and producing a signal for reproducing half of the scanning lines per one frame.

An example of the processing circuit for converting an MUSE signal to a sequential scanning signal is shown in FIG. 6. In FIG. 6, the same circuits as those of FIG. 1 are denoted by identical numerals. In FIG. 6, numeral 50 denotes a signal input terminal coupled to the changeover circuit 3 and numeral 51 denotes a signal input terminal coupled to the television system discrimination control circuit 17. Unnecessary components of 8.1 MHz and higher frequencies contained in the MUSE signal inputted from the terminal 50 are obstructed by an LPF 52. The MUSE signal is then converted into a digital signal by an ADC 53. The resultant digital signal is supplied to a video processing system and a synchronizing processing system. In the video processing system, the digital signal is gated in a gate circuit 54 by a signal inputted from the television system discrimination control circuit 17 through the terminal 51. Only in case of the MUSE signal, the digital signal is supplied to a nonlinear deemphasis circuit 55 succeeding the gate circuit 54. In the nonlinear deemphasis circuit 55, the MUSE signal undergoes inverse correction with respect to nonlinear processing for transmission and then deemphasis. The digitized MUSE signal is then supplied to a successive scanning interpolation circuit 56. Configuration of the sequential scanning interpolation circuit 56 will be described later. In a color line sequential demultiplexing circuit 57, line sequential multiplexing of the color signal and the luminance signal of the signal which has undergone interpolation processing is demultiplexed. The resultant signal is outputted to output terminals 60, 61 and 62 as the sequential scanning signal via a DAC 59 and an LPF 58.

In the synchronizing processing system, a frame pulse is detected from the digitized MUSE signal by a frame pulse detection circuit 63. A horizontal synchronizing signal is detected from the digitized MUSE signal by a horizontal synchronizing gate circuit 64 and a horizontal synchronizing detection circuit 65. Synchronizing generated by an internal synchronizing generation circuit 66 is synchronized to the incoming signal. A frequency division circuit included in the internal synchronizing generation circuit 66, a phase comparison circuit 67 and a VCO 68 are so configured that a PLL circuit may be formed and secure phase synchronism with the incoming horizontal synchronizing signal may be attained. The output of the phase comparison circuit 67 is supplied to not only the VCO 68 but also a phase lock detection circuit 69 for the purpose of detecting pull-out. In case of pull-out, a changeover circuit 70 is so controlled that the gate signal of the horizontal synchronizing gate circuit 64 may be switched from a pulse generated by the internal synchronizing generation circuit 66 to a pulse produced directly from the incoming signal. Further, the detected output of the phase lock detection circuit 69 is supplied to the television system discrimination control circuit 17 as well through an output terminal 71 and used for automatic discrimination of the television system. A display horizontal synchronizing signal H and a display vertical synchronizing signal V generated by the internal synchronizing generation circuit 66 are supplied to the synchronizing changeover circuit 11 through output terminals 72 and 73.

Figure 7:
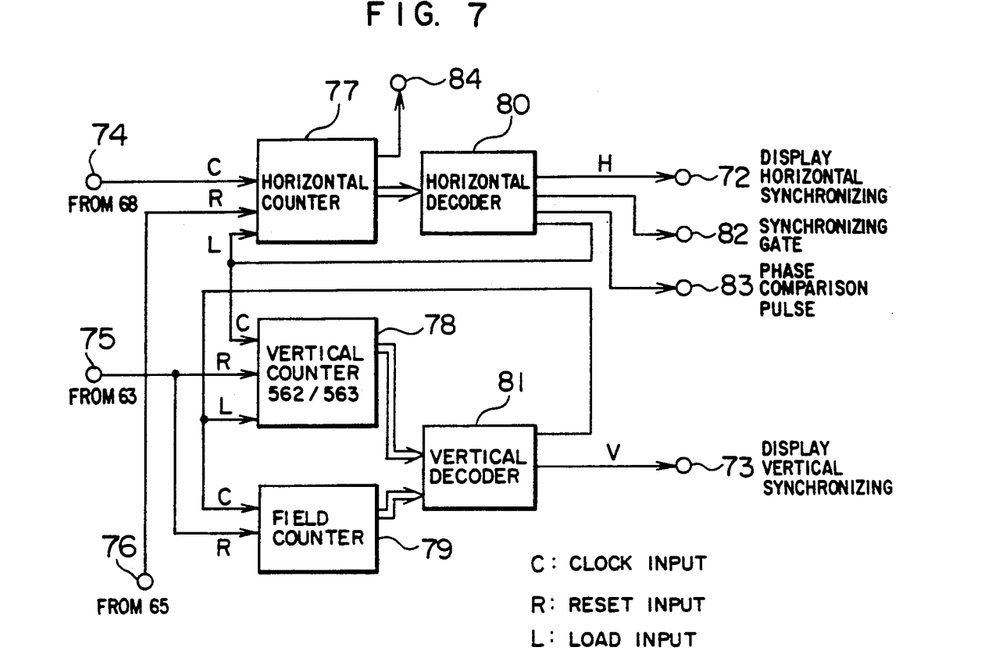
FIGS. 7 and 8 are block diagrams showing examples of more detailed configuration of principal constituent circuits of the circuit shown in FIG. 6.
Figure 8:
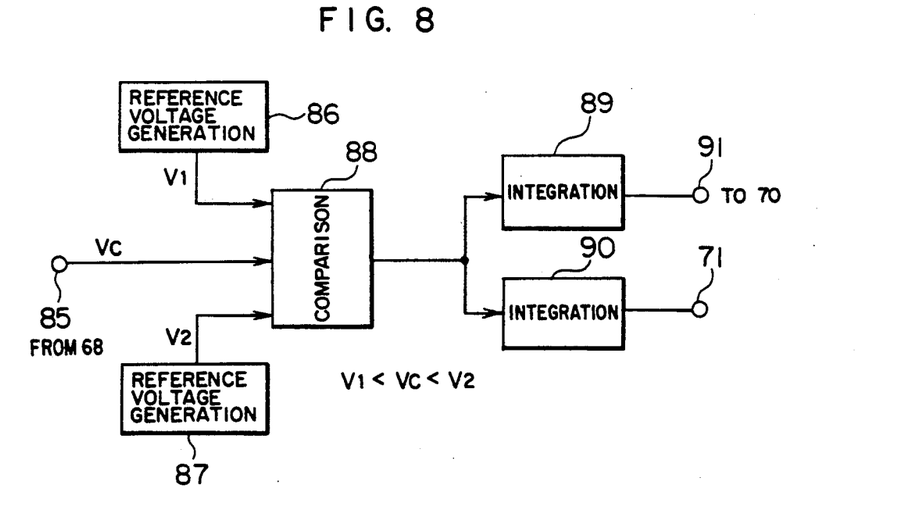

Examples of the internal synchronizing generation circuit 66 generating synchronizing signals for sequential scanning and the phase lock detection circuit 69, which are considered a feature of FIG. 6, are shown in FIGS. 7 and 8, respectively. In FIGS. 7 and 8, the same circuits as those of FIG. 6 are denoted by identical numerals. In FIG. 7, numeral 74 denotes a clock input terminal wherethrough a system clock signal is inputted from the VCO 68, and numeral 75 denotes an input terminal for the frame pulse supplied from the frame pulse detection circuit 63. Further, numeral 76 denotes an input terminal for the horizontal synchronizing signal supplied from the horizontal synchronizing detection circuit 65. By using the horizontal synchronizing signal inputted from the terminal 76 as the reference, a horizontal counter 77 counts clock signals inputted from the terminal 74, and supplies a system clock signal of 16.2 MHz to an output terminal and a count output signal to a horizontal decoder circuit 80. The horizontal decoder circuit 80 feeds back the decoded value to the horizontal counter 77 so that pulses of the horizontal period may be generated. Further, the horizontal decoder circuit 80 outputs a display horizontal synchronizing signal on an output terminal 72, a synchronizing gate signal to be supplied to the changeover circuit 70 on an output terminal 82, and a phase comparison pulse to be supplied to the phase comparison circuit 67 on an output terminal 83. A vertical counter circuit 78 is supplied with the horizontal period pulse generated by the horizontal decoder circuit 80 as the clock. By using the frame pulse inputted from the terminal 75 as the reference, the vertical counter circuit 78 counts the clocks up to alternately 562 and 563. This alternate maximum value of count is defined by the output of the field counter 79. It can be implemented by changing, in a vertical decoder circuit 81, the decoded value to be fed back to the load input of the vertical counter circuit 78. As shown in FIG. 7, the output of the vertical decoder as it is can be supplied as a display vertical synchronizing signal to be supplied from the output terminal 73 to the changeover circuit 11 because of sequential scanning. This results in an advantage that the vertical synchronizing signal can be generated more simply than conventional interlace scanning. As for the internal synchronizing generation circuit 66 as a whole, a vertical counter is formed while taking a frame as the unit and decoding is performed in each field in the conventional processing circuit for the MUSE signal. On the other hand, a counter can be formed while taking a field as the unit because of sequential scanning. As a result, the scale of the circuit can be reduced.

The phase lock detection circuit shown in FIG. 8 will now be described. In FIG. 8, numeral 85 denotes an input terminal wherethrough the output signal $V_c$ of the phase comparison circuit 67 is inputted. Reference voltage values $V_1$ and $V_2$ respectively generated by reference voltage generation circuits 86 and 87 are compared in a comparison circuit 88 with the signal $V_c$ thus inputted. Since the synchronizing signal of the MUSE signal has no periodical change, the phase lock state can be simply judged in the comparison circuit 88 by voltage comparison ($V_1 < V_c < V_2$) alone, for example. The result of this judgment is supplied to the changeover circuit 70 via an integration circuit 89 and an output terminal 91 and is used for pull-in control of synchronization. Further, the result of this judgment is outputted to the television system discrimination control circuit 17 via an integration circuit 90 having a different integration time and an output terminal 71 as a signal indicating the arrival of the MUSE signal. Because the MUSE signal is transmitted with synchronization relations having extremely high precision, reception of the MUSE signal can be detected in simple configuration shown in FIG. 8 as heretofore described.

The sequential scanning interpolation circuit 56, which is important in sequential scanning of the video processing system, will now be described in detail.

Figure 9:
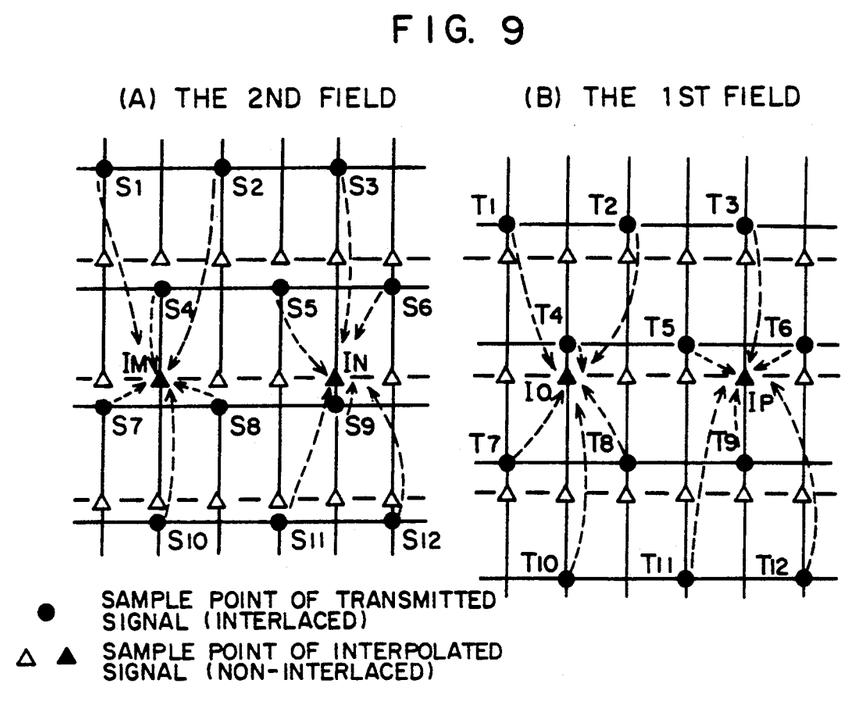
FIGS. 9 and 10 are diagrams for explaining a sequential scanning interpolation circuit shown in FIG. 11.
Figure 10:
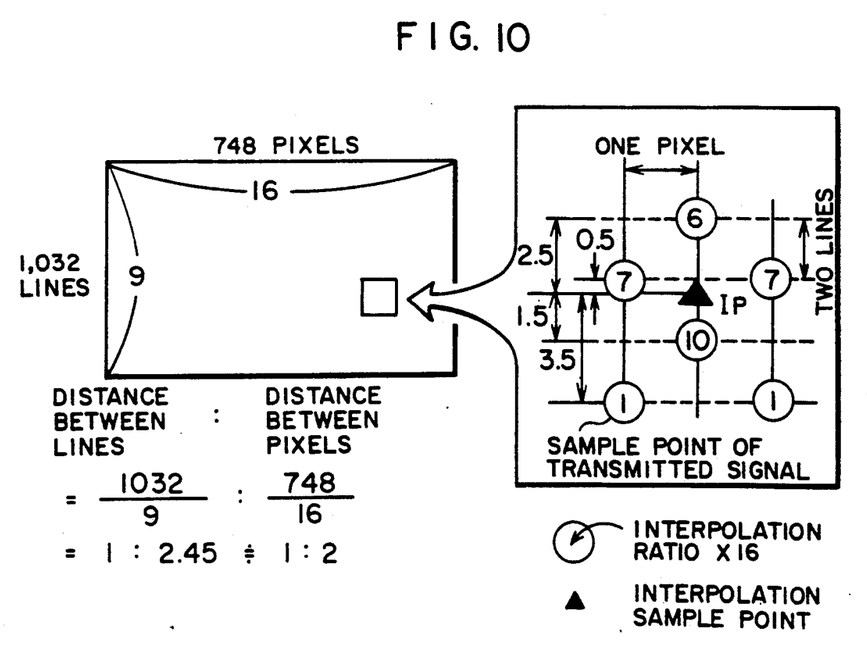
Figure 11:
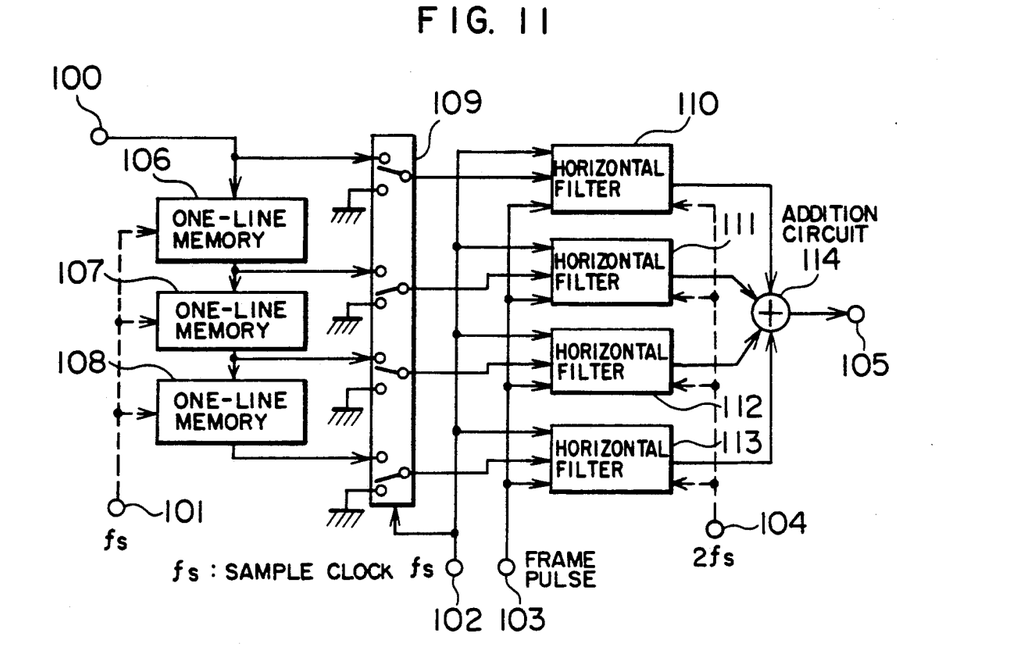
FIG. 11 is a block diagram showing a concrete example of a sequential scanning interpolation circuit shown in FIG. 6.

FIG. 9 exemplifies sample points transmitted by the MUSE signal and sample points interpolated by the sequential scanning interpolation circuit 56. FIG. 10 is a diagram showing an example of pixel arrangement and interpolation ratio. FIG. 11 is a diagram showing an example of concrete configuration of the sequential scanning interpolation circuit 56. FIG. 9 is also a diagram representing the scanning line structure of FIG. 3 more definitely. Positions of circle marks indicate transmitted sample points, and positions of triangle marks indicate interpolated sample points of interpolated scanning lines. For convenience of description of interlace scanning, it is now assumed that upper scanning lines of adjacent upper and lower scanning lines are transmitted in the second field (a) and lower scanning lines are transmitted in the first field (b). Assuming that transmitted sample points are $S_1$ to $S_{12}$ and interpolated sample points to be marked are $I_M$ and $I_N$, $I_M$ and $I_N$ can be represented by the following equations.

$$I_M = \frac{1}{16}(S_1 + S_2) \frac{10}{16} S_4 + \frac{7}{16}(S_7 + S_8) + \frac{6}{16} S_{10} \quad (1)$$

$$I_N = \quad (2)$$

$$\frac{2}{16} S_3 + \frac{5}{16}(S_5 + S_6) + 9\frac{14}{16} S_9 + \frac{3}{16}(S_{11} + S_{12})$$

Assuming now in the same way that transmitted sample points in the first field are $T_1$ to $T_{12}$ and interpolated sample points are $I_O$ and $I_P$, $I_O$ and $I_P$ can be represented by the following equations.

$$I_O = \frac{3}{16}(T_1 + T_2) \frac{14}{16} T_4 + \frac{5}{16}(T_7 + T_8) + \frac{6}{16} T_{10} \quad (3)$$

$$I_P = \quad (4)$$

$$\frac{6}{16} T_3 + \frac{7}{16}(T_5 + T_6) + 9\frac{14}{16} T_9 + \frac{1}{16}(T_{11} + T_{12})$$

The interpolated sample points indicated by the equations (1) to (4) are so selected that sample points after interpolation may be located at identical positions in space and the processing centroid of the video signal may not be displaced in sequential scanning synchronization. An example of pixel arrangement and interpolation ratio at this time will now be described by referring to FIG. 10. In case of a MUSE signal, pixels transmitted in one frame comprise 748 points in the horizontal direction and 1032 points in the vertical direction. This corresponds to display having an aspect ratio 16 : 9. As shown in FIG. 10, therefore, the ratio of the distance between lines on the display to the distance between pixels becomes nearly 1 : 2. Taking the above described interpolated sample point $I_P$ as an example, positions and interpolation ratios of surrounding transmitted sample points become as shown in FIG. 10. A concrete circuit for realizing such interpolation is shown in FIG. 11. With reference to FIG. 1, a signal inputted from an input terminal 100 is inputted to a changeover circuit 109 as a signal corresponding to four scanning lines via three one-line memories 106, 107 and 108 driven by a sample clock (hereafter referred to as fs) inputted from an input terminal 101. In the changeover circuit 109, zero level is selected as the input signal at intervals of half a period and is supplied to horizontal filter circuits 110 to 113 driven by 2fs. In the horizontal filters 110 to 113, coefficients are changed while taking half period of fs inputted from a terminal 102 as the unit and while taking a field as the unit by using a frame pulse inputted from a terminal 103. The horizontal filters 110 to 113 so operate as to conform to the equations (b 1) to (4). Outputs of these horizontal filters 110 to 113 are added up in an addition circuit 114. The resultant sum signal is outputted to an output terminal 105 as an interpolation signal.

In this way, the present embodiment has an advantage that the video signal for sequential scanning can be obtained in extremely simple circuit configuration.

Figure 12A:
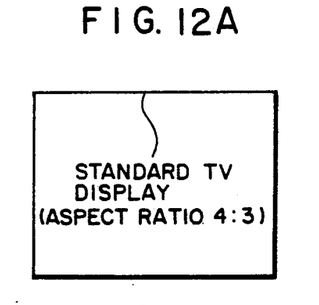
FIGS. 12A to 12D are illustrative diagrams showing examples of pictures on a display.
Figure 12B:
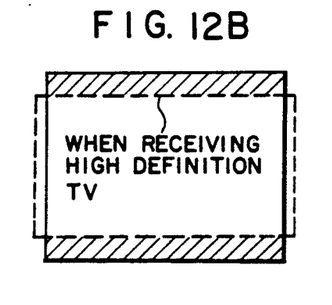
Figure 12C:
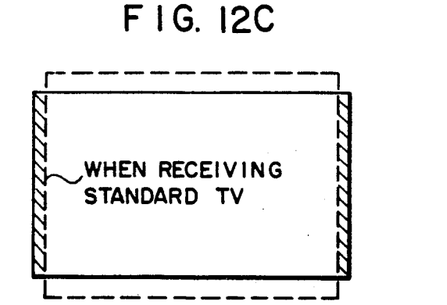
Figure 12D:
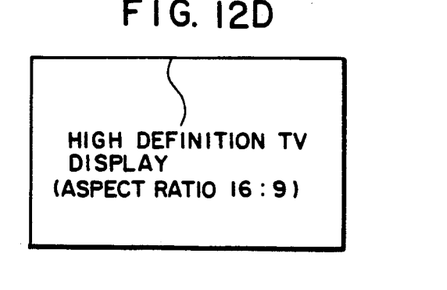

Finally, operation of the deflection size changeover circuit 16 will now be described. The deflection size changeover circuit 16 receives the control signal from the television system discrimination control circuit 17 and switches the deflection size of the deflection circuit 12 so that display screens as shown in FIG. 12 may be obtained. Deflection size switching is realized by changing the amplitude of the sawtooth wave for deflection. Among FIGS. 12A to 12D, FIGS. 12A and 12B show the case where a standard television display (with aspect ratio 4 : 3) is used as the display 13. FIGS. 12C and 12D show the case where a high definition display (with aspect ratio 16 : 9) is used as the display 13. FIGS. 12A and 12C show the case where a standard television signal is received. FIGS. 12B and 12D shows the case where a high definition television signal is received. Irrespective of the aspect ratio of the display 13, television signals of both the standard system and the high definition system can thus be displayed by changing over the horizontal and vertical deflection sizes. At the start of spread of high definition television when broadcasts of high definition television signal are relatively few, the display methods of FIGS. 12A and 12B are more efficient.

The second conversion circuit for converting an interlace high definition television signal into a noninterlace television signal of the present invention is not limited to 562/563 lines per one field of the non-interlace signal. Different numbers of the scanning line may be accepted in such a manner that the time-axis of the signal is converted by storing the output of the successive scanning interpolation circuit 56 of FIG. 6 in another memory.

As heretofore described in detail, the present invention provides a receiving apparatus compatible with both standard television and high definition television, which is small in processing circuit scale and slighter in picture quality degradation.

We claim:

1. A television receiver compatible with both a standard system television signal and a high definition television signal, said television receiver comprising:
   first conversion means for receiving an interlace standard system television signal and converting said interlace standard system television signal into a first non-interlace television signal;
   second conversion means for receiving an interlace high definition television signal and converting said interlace high definition television signal into a second non-interlace television signal;
   discriminating means for discriminating whether a received signal is a standard system television signal or a high definition television signal; and
   selecting means for selecting one of and output of said first conversion means and an output of said second conversion means based on a discrimination result from said discriminating means.

2. A television receiver according to claim 1, wherein said first conversion means comprises an interpolation circuit for interpolating between scanning lines of each field of the received standard system television signal to thereby make a number of scanning lines per field equivalent to twice that of the received standard system television signal.

3. A television receiver according to claim 2, wherein said interpolation circuit comprises:
   a circuit for judging whether a television signal represents a moving image or a still image; and
   a motion-adaptive signal processing circuit for producing, in case of a moving image, an interpolation signal by performing computation with respect to signals of upper and lower scanning lines within a field in an identical horizontal direction, and for producing, in case of a still image, an interpolation signal by using signals of corresponding scanning positions of adjacent fields.

4. A television receiver according to any one of claims 1 to 3, wherein said second conversion means includes a synchronizing generation circuit for generating a vertical synchronizing signal synchronized to a horizontal synchronizing signal of the second non-interlace television signal, and an interpolation circuit means which interpolates signals in such a manner that interpolation points of an nth field, where n is a positive integer, coincide with interpolation points of an (n+1)th field on a screen.

5. A television receiver according to claim 4, wherein said interpolation circuit means enables interpolation between scanning lines of each field of the received high definition television signal to thereby make a number of scanning lines per field substantially equivalent to that of the received high definition television signal.

6. A television receiver according to claim 5, wherein said interpolation circuit produces an interpolation signal so that an interpolation scanning line of an nth field, where n is a positive integer, and an interpolation scanning line of an (n+1)th field, coincide with each other in a vertical direction.

7. A television receiver according to claim 1, further comprising:
   deflection means capable of scanning on an image receiving screen by using scanning lines with selectively either an aspect ratio of a standard television system signal or an aspect ratio of a high definition television signal; and
   said selecting means controlling said deflection means such that when the received signal is a standard system television, an aspect ratio of a standard television signal is selected, and when the receive signal is a high definition television signal, an aspect ratio of a high definition television signal is selected.

8. A television receiver according to claim 7, wherein said discriminating means comprises:
   means for detecting a phase difference between a horizontal synchronizing signal of the received signal and a predetermined internal synchronizing signal; and
   means for judging that the received signal is a high definition television signal when said phase difference does not exceed a predetermined value and for judging that the received signal is a standard system television signal when said phase difference exceeds the predetermined value.

9. A television receiver according to claim 7, wherein said discriminating means discriminates a standard television signal or a high definition television signal from the received signal according to a horizontal scanning of the received signal.

10. A television receiver according to claim 7, wherein said discriminating means is a single discrimination circuit.

11. A television receiver according to claim 1, wherein the first non-interlace television signal has substantially the same number of scanning lines as the second non-interlace television signal.

* * * * *